United States Patent
Choi et al.

(10) Patent No.: US 11,316,636 B2
(45) Date of Patent: Apr. 26, 2022

(54) METHOD FOR TRANSMITTING SRS AND TERMINAL THEREFOR

(71) Applicant: LG ELECTRONICS INC., Seoul (KR)

(72) Inventors: Kukheon Choi, Seoul (KR); Jiwon Kang, Seoul (KR); Kyuseok Kim, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/652,024

(22) PCT Filed: Oct. 11, 2018

(86) PCT No.: PCT/KR2018/011943
§ 371 (c)(1),
(2) Date: Mar. 27, 2020

(87) PCT Pub. No.: WO2019/074289
PCT Pub. Date: Apr. 18, 2019

(65) Prior Publication Data
US 2020/0252182 A1 Aug. 6, 2020

Related U.S. Application Data

(60) Provisional application No. 62/572,425, filed on Oct. 14, 2017.

(51) Int. Cl.
*H04W 4/00* (2018.01)
*H04L 5/00* (2006.01)
*H04W 72/04* (2009.01)

(52) U.S. Cl.
CPC ........... *H04L 5/0048* (2013.01); *H04W 72/04* (2013.01)

(58) Field of Classification Search
CPC ........... H04J 2203/0069; H04W 72/04; H04W 72/1268; H04W 28/02; H04W 72/12;
(Continued)

(56) References Cited

U.S. PATENT DOCUMENTS 8,086,272 B2 * 12/2011 Teo ................. H04B 7/061
455/562.1
2010/0142467 A1 * 6/2010 Tiirola ................. H04L 5/0094
370/329

(Continued)

OTHER PUBLICATIONS

PCT International Application No. PCT/KR2018/011943, Written Opinion of the International Searching Authority dated Jan. 25, 2019, 19 pages.
(Continued)

*Primary Examiner* — Shantell L Heiber
(74) *Attorney, Agent, or Firm* — Lee Hong Degerman Kang Waimey

(57) ABSTRACT

A method for transmitting an SRS by a terminal may comprise the steps of: receiving, from a base station, one of an SRS resource indicator (SRI), a CSI-RS resource indicator (CRI), a synchronization signal block (SSB) identifier, and an uplink transmission configuration indicator (TCI); on the basis of whether the received indicator/identifier includes an indication that the corresponding indicator/identifier is commonly used for an SRS resource group or an indication that the corresponding indicator/identifier is used for a first SRS resource of the SRS resource group, determining whether to use the same transmission beam or use different transmission beams to transmit an SRS in the SRS resource group; on the basis of the determination, determining a transmission beam for the terminal, indicated by the received indicator/identifier; and transmitting the SRS in the first SRS resource on the basis of the transmission beam for the terminal, wherein the SRS resource group includes the
(Continued)

first SRS resource and a second SRS resource. The UE is capable of communicating with at least one of another UE, a UE related to an autonomous driving vehicle, a base station or a network.

7 Claims, 9 Drawing Sheets

(58) Field of Classification Search
CPC ... H04L 5/0048; H04B 7/0626; H04B 7/0632; H04B 7/0617; H04B 7/0408
See application file for complete search history.

(56) References Cited

U.S. PATENT DOCUMENTS

| | | | |
|---|---|---|---|
| 2017/0047978 A1* | 2/2017 | Kim | H04B 7/0626 |
| 2017/0302355 A1* | 10/2017 | Islam | H04W 72/042 |
| 2018/0020365 A1* | 1/2018 | Xiong | H04W 88/02 |
| 2019/0297639 A1* | 9/2019 | Wang | H04B 7/0695 |
| 2020/0204316 A1* | 6/2020 | Zhang | H04L 5/0048 |
| 2020/0280408 A1* | 9/2020 | Nilsson | H04B 7/10 |

OTHER PUBLICATIONS

LG Electronics, "Discussion on non-codebook based transmission for UL", 3GPP TSG RAN WG1 Meeting #90bis, R1-1717937, Oct. 2017, 3 pages.
Samsung, "On Beam Management, Measurement and Reporting", 3GPP TSG RAN WG1 Meeting #90bis, R1-1717605, Oct. 2017, 16 pages.
Sony, "Summary of SRS", 3GPP TSG RAN WG1 Meeting #90bis, R1-1718980, Oct. 2017, 12 pages.
Mediatek, "DL and UL Beam Management", 3GPP TSG RAN WG1 Meeting #90bis, R1-1718333, Oct. 2017, 7 pages.
Huawei, et al., "Beam indication for control and data channels", 3GPP TSG RAN WG1 Meeting #90bis, R1-1718238, Oct. 2017, 8 pages.

* cited by examiner

METHOD FOR TRANSMITTING SRS AND TERMINAL THEREFOR

CROSS-REFERENCE TO RELATED APPLICATIONS

This application is the National Stage filing under 35 U.S.C. 371 of International Application No. PCT/KR2018/011943, filed on Oct. 11, 2018, which claims the benefit of U.S. Provisional Application No. 62/572,425, filed on Oct. 14, 2017, the contents of which are all hereby incorporated by reference herein in their entirety.

TECHNICAL FIELD

The present disclosure relates to a wireless communication system, and more particularly, to a method of transmitting a sounding reference signal (SRS) and user equipment (UE) therefor.

BACKGROUND ART

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc. In a next-generation 5G system, scenarios may be divided into Enhanced Mobile Broadband (eMBB)/Ultra-reliable Machine-Type Communications (uMTC)/Massive Machine-Type Communications (mMTC), etc. eMBB is a next-generation mobile communication scenario having high spectrum efficiency, high user experienced data rate, high peak data rate, etc., uMTC is a next-generation mobile communication scenario having ultra-reliability, ultra-low latency, ultra-high availability, etc. (e.g., V2X, emergency service, remote control), and mMTC is a next-generation mobile communication scenario having low cost, low energy, short packet, and massive connectivity (e.g., IoT).

DISCLOSURE

Technical Problem

An object of the present disclosure is to provide a method by a user equipment (UE) transmits a sounding reference signal (SRS).

Another object of the present disclosure is to provide a UE for transmitting an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of transmitting a sounding reference signal (SRS) by a user equipment (UE). The method may include receiving from a base station any one of an SRS resource indicator (SRI), a channel state information reference signal (CSI-RS) indicator (CRI), a synchronization signal block (SSB) identifier, and an uplink transmission configuration indicator (TCI), determining whether to use the same transmission beam or different transmission beams for SRS transmission in an SRS resource group depending on whether the received one includes information that the received one is commonly used for the SRS resource group or information that the received one is used for a first SRS resource in the SRS resource group, determining a transmission beam of the UE based on the determination, wherein the transmission beam of the UE is indicated by the received one, and transmitting the SRS on the first SRS resource based on the transmission beam of the UE. The SRS resource group may include the first SRS resource and a second SRS resource.

The method may further include transmitting the SRS on the second SRS resource based on the transmission beam of the UE indicated by the received one when the received one is commonly used for the SRS resource group.

The method may further include transmitting the SRS on the second SRS resource based on a transmission beam different from the transmission beam of the UE when the received one is only for the first SRS resource in the SRS resource group.

The method may further include transmitting the SRS on the second SRS resource based on a transmission beam identical to the transmission beam of the UE when the received one includes information that the received one is for the first SRS resource in the SRS resource group but is commonly available for the SRS resource group.

The UE may receive the any one through downlink control information (DCI), radio resource control (RRC) signaling, or a medium access control control element (MAC-CE).

The determination of the transmission beam of the UE may include determining a reception beam applied to the CRI or the SSB identifier as the transmission beam of the UE when the received one is the CRI or the SSB identifier.

The UE may transmit the SRS in one, two, or four symbols on the first SRS resource.

In another aspect of the present disclosure, provided herein is a user equipment (UE) for transmitting a sounding reference signal (SRS). The UE may include: a received configured to receive from a base station any one of an SRS resource indicator (SRI), a channel state information reference signal (CSI-RS) indicator (CRI), a synchronization signal block (SSB) identifier, and an uplink transmission configuration indicator (TCI); a processor configured to determine whether to use the same transmission beam or different transmission beams for SRS transmission in an SRS resource group depending on whether the received one includes information that the received one is commonly used for the SRS resource group or information that the received one is used for a first SRS resource in the SRS resource group and determine a transmission beam of the UE based on the determination, wherein the transmission beam of the UE is indicated by the received one; and a transmitter configured to transmit the SRS on the first SRS resource based on the transmission beam of the UE. The SRS resource group may include the first SRS resource and a second SRS resource.

When the received one is commonly used for the SRS resource group, the transmitter may be further configured to transmit the SRS on the second SRS resource based on the transmission beam of the UE indicated by the received one.

When the received one is only for the first SRS resource in the SRS resource group, the transmitter may be further configured to transmit the SRS on the second SRS resource based on a transmission beam different from the transmission beam of the UE.

When the received one includes information that the received one is for the first SRS resource in the SRS resource group but is commonly available for the SRS resource group, the transmitter may be further configured to transmit the SRS on the second SRS resource based on a transmission beam identical to the transmission beam of the UE.

The receiver may be configured to receive the any one through downlink control information (DCI), radio resource control (RRC) signaling, or a medium access control control element (MAC-CE).

When the received one is the CRI or the SSB identifier, the processor may be configured to determine a reception beam applied to the CRI or the SSB identifier as the transmission beam of the UE in determining the transmission beam of the UE.

The transmitter may be configured to transmit the SRS in one, two, or four symbols on the first SRS resource.

Advantageous Effects

According to the present disclosure, when sounding reference signal (SRS) transmission is performed in a new radio access technology (NR) system, a configuration for informing a user equipment (UE) transmission (Tx) beam for uplink in an SRS resource group including multiple SRS resources may enable a UE to efficiently perform the SRS transmission in the NR system.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

BEST MODE

Figure 1:
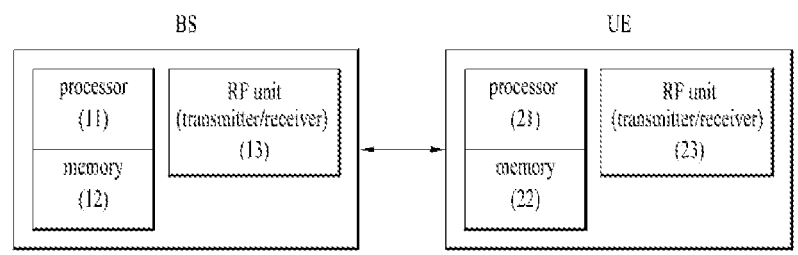
FIG. 1 is a diagram illustrating a wireless communication system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a wireless communication system for implementing the present disclosure.

Referring to FIG. 1, the wireless communication system includes a base station (BS) 10 and one or more UEs 20. On downlink (DL), a transmitter may be a part of the BS and a receiver may be a part of the UEs 20. On uplink (UL), the BS 10 may include a processor 11, a memory 12, and a radio frequency (RF) unit 13 (a transmitter and a receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (a transmitter and a receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be called a multiple input multiple output (MIMO) system.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

Layers of a radio interface protocol between the UE 20 and the BS 10 of the wireless communication system (network) may be classified into a first layer L1, a second layer L2, and a third layer L3, based on 3 lower layers of open systems interconnection (OSI) model well known in communication systems. A physical layer belongs to the first layer and provides an information transfer service via a physical channel. A radio resource control (RRC) layer belongs to the third layer and provides control radio resources between the UE and the network. The UE 10 and the BS 20 may exchange RRC messages with each other through the wireless communication network and the RRC layers.

Analog Beamforming

In a millimeter wave (mmW) system, since a wavelength becomes shorter, a plurality of antenna elements may be installed in the same area. That is, considering that the wavelength at a band of 30 GHz is 1 cm, a total of 64 (8×8) antenna elements may be installed in a 4*4 cm panel at intervals of 0.5 lambda (wavelength) in the case of a 2-dimensional array. Therefore, in the mmW system, it is possible to improve coverage or throughput by increasing beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

As an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 2A:
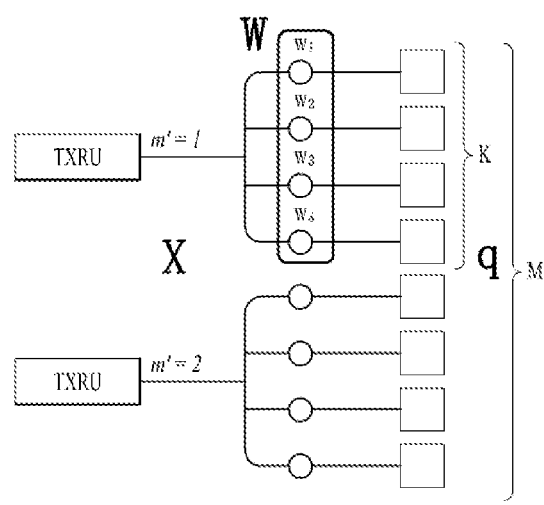
FIG. 2a is a diagram illustrating TXRU virtualization model option 1 (sub-array model) and FIG. 2b is a diagram illustrating TXRU virtualization model option 2 (full connection model).
Figure 2B:
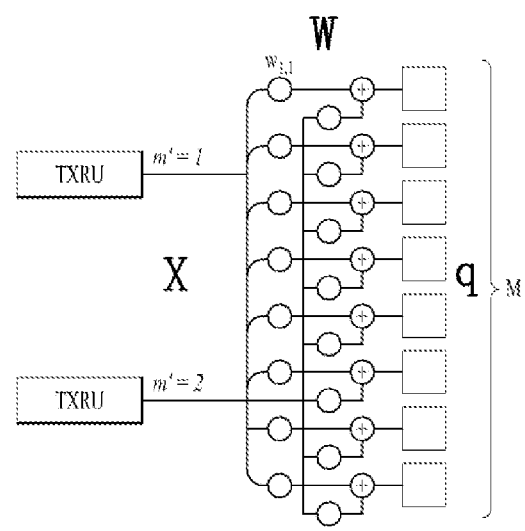

FIG. 2*a* is a diagram illustrating TXRU virtualization model option 1 (sub-array model) and FIG. 2*b* is a diagram illustrating TXRU virtualization model option 2 (full connection model).

FIGS. 2*a* and 2*b* show representative examples of a method of connecting TXRUs and antenna elements. Here, the TXRU virtualization model shows a relationship between TXRU output signals and antenna element output signals. FIG. 2*a* shows a method of connecting TXRUs to sub-arrays. In this case, one antenna element is connected to one TXRU. In contrast, FIG. 2*b* shows a method of connecting all TXRUs to all antenna elements. In this case, all antenna elements are connected to all TXRUs. In FIGS. 2*a* and 2*b*, W indicates a phase vector weighted by an analog phase shifter. That is, W is a major parameter determining the direction of the analog beamforming. In this case, the mapping relationship between channel state information-reference signal (CSI-RS) antenna ports and TXRUs may be 1-to-1 or 1-to-many.

Hybrid Beamforming

Figure 3:
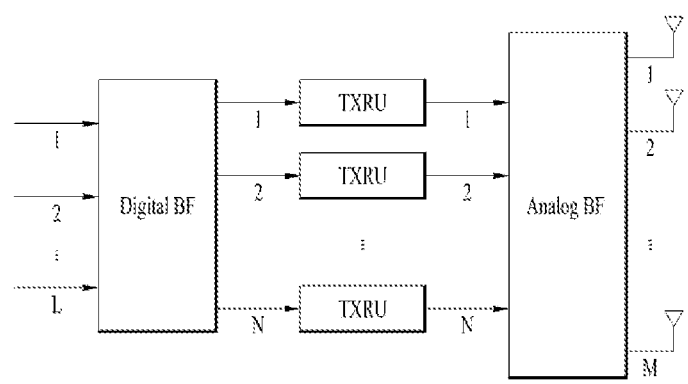
FIG. 3 is a block diagram for hybrid beamforming.

FIG. 3 is a block diagram for hybrid beamforming.

Figure 4:
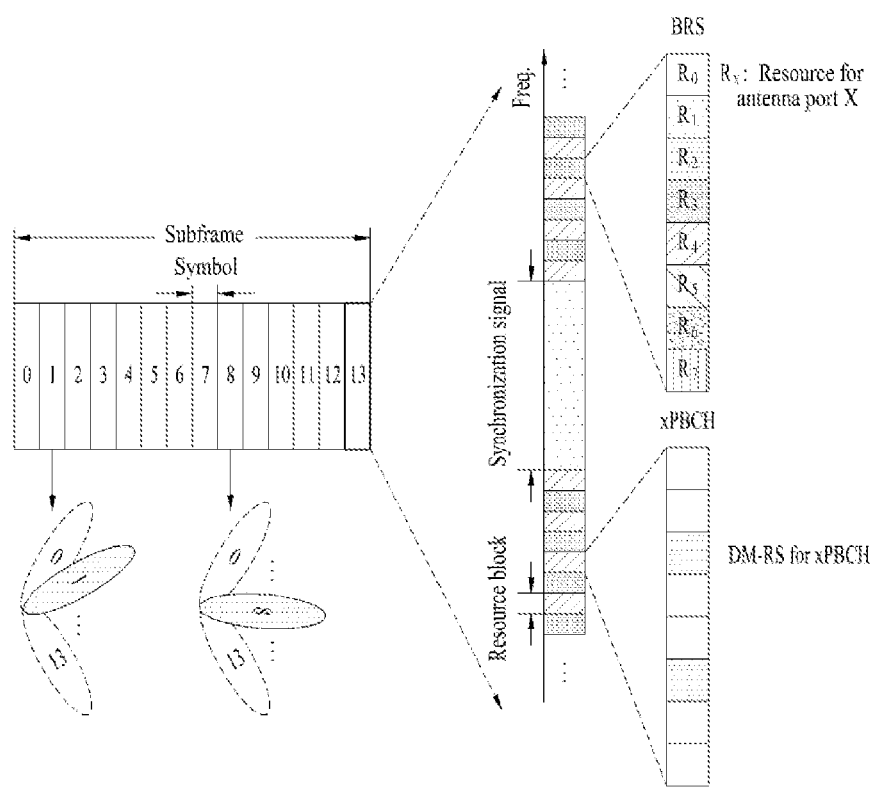
FIG. 4 is a diagram illustrating beams mapped to BRS symbols in hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 4, the hybrid beamforming structure may be expressed by N transceivers (TXRUs) and M physical antennas. Digital beamforming for L data layers to be transmitted by a transmission side may be expressed by an N×L matrix, N digital signals are converted into analog signals through TXRUs and then analog beamforming expressed by an M×N matrix is applied.

FIG. 3 shows a hybrid beamforming structure in terms of the TXRUs and physical antennas. At this time, in FIG. 3, the number of digital beams is L and the number of analog beams is N. Further, in the new RAT system, a BS is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the BS uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

FIG. 4 is a diagram illustrating beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Figure 5:
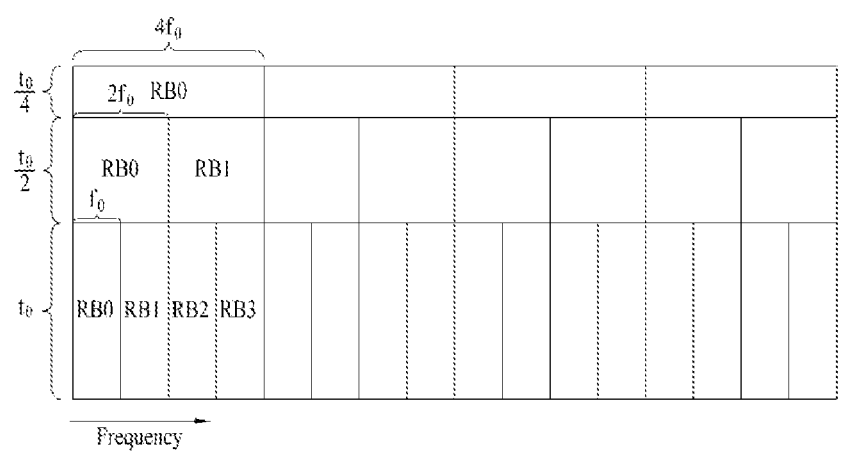
FIG. 5 is a diagram illustrating symbol/sub-symbol alignment between different numerologies.

FIG. 5 is a diagram illustrating symbol/sub-symbol alignment between different numerologies.

New RAT(NR) Numerology Characteristics

In NR, a method of supporting scalable numerology is being considered. That is, a subcarrier spacing of NR is (2n×15) kHz and n is an integer. From the nested viewpoint, a subset or a superset (at least 15, 30, 60, 120, 240, and 480 kHz) is being considered as a main subcarrier spacing. Symbol or sub-symbol alignment between different numerologies was supported by performing control to have the same CP overhead ratio.

In addition, the numerology is determined in a structure for dynamically allocating time/frequency granularity according to services (eMBB, URLLC and mMTC) and scenarios (high speed, etc.).

Figure 6:
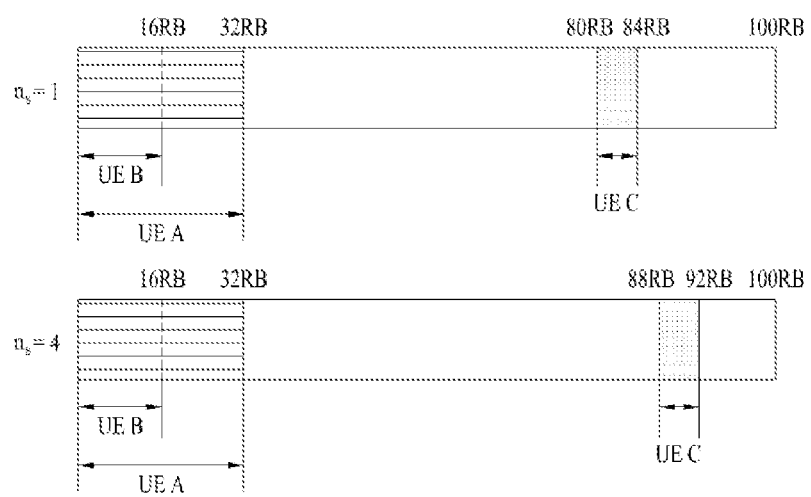
FIG. 6 is a diagram illustrating an LTE hopping pattern (ns=1→ns=4).

FIG. 6 is a diagram illustrating an LTE hopping pattern (ns=1→ns=4).

An example of configuring an LTE hopping pattern will be described.

LTE hopping pattern parameters may be set through cell-specific RRC signaling. For example, $C_{SRS}=1$ $N_{RB}^{UL}=100$, $n_j=1$, $n_s=1$ may be set.

Next, LTE hopping pattern parameters may be set through UE-specific RRC signaling.

UE A: $B_{SRS}=1$, $b_{hop}=0$, $n_{RRC}=22$, $T_{SRS}=10$

UE B: $B_{SRS}=2$, $b_{hop}=0$, $n_{RRC}=10$, $T_{SRS}=5$

For example, UE C: $B_{SRS}=3$, $b_{hop}=2$, $n_{RRC}=23$, $T_{SRS}=2$ may be set.

In the NR system, one SRS resource may be transmitted in one or multiple symbols (i.e., N symbols) (where N is the number of symbols and has a value of 1, 2, or 4). A group consisting of specific SRS resources may be referred to as an SRS resource group (or an SRS resource set set). In this case, if beam correspondence is valid, a method of providing a CSI-RS resource indicator (CRI) designated for a CSI-RS or a synchronization signal block (SSB) identifier (ID) (or index) designated for an SSB may be considered to indicate a UE transmit (Tx) beam for one SRS resource. On the other hand, if there is no beam correspondence, a method of providing an SRS resource indicator (SRI) designated for an SRS may be considered. In the NR, the CRI and the SRI may be used to indicate a preferred beam.

However, a method capable of informing a UE Tx beam on one SRS resource in one SRS resource group (or one SRS resource set) has not been defined yet (although both are available, the term "SRS resource group" is mainly used herein). Accordingly, the configuration therefor is required.

Proposal 1 (Configuration of UE Tx Beam Based on SRI)

According to the following methods, a UE TX beam on an SRS resource in an SRS resource group (the SRS resource group may include a plurality of SRS resources) may be designated.

1. A common SRI may be configured for one SRS resource group. Thus, a BS may transmit a specific common SRI for a specific SRS resource group through L1 (DCI), L2 (medium access control control element (MAC-CE)), or L3 (DCI) signaling to designate a UE Tx beam on SRS resources in the SRS resource group. Upon receiving the common SRI, a UE may know that the UE has the same UE Tx beam for the SRS resources in the corresponding SRS resource group.

2. A BS may transmit to a UE an SRI for a random SRS resource or a fixed SRS resource (e.g., the first SRS resource) in a resource group. In this case, the BS may configure a common SRI application field in the SRI. When the common SRI application field is ON, UE Tx beams on SRS resources in the SRS resource group may be set to a UE Tx beam corresponding to an SRI designated for the random or fixed SRS resource in the SRS resource group. When the common SRI application field is OFF, each SRS resource in the SRS resource group may be for a different Tx beam rather than the same beam. That is, when the common SRI application field is OFF, the UE may implicitly understand that each SRS resource corresponds to a different Tx beam.

Proposal 2 (Configuration of UE Tx Beam Based on CRI/SSB ID)

When UL/DL beam correspondence (reciprocity) is satisfied, a UE Tx beam on an SRS resource in an SRS resource group may be designated based on the following methods.

1. A common CRI and a common SSB ID and may be configured for one SRS resource group. Thus, a BS may transmit a specific common SRI and/or a specific common SSB ID for a specific SRS resource group to a UE through L1 (DCI), L2 (MAC-CE), or L3 (DCI) signaling to designate a UE Tx beam on SRS resources in the SRS resource group. Upon receiving the common CRI and/or the common SSB ID for the specific SRS resource group, the UE may know that UE receive (Rx) beams applied to a CSI-RS group indicated by the common CRI and/or an SSB group indicated by the common SSB are equally used as the UE Tx beam on the SRS resources in the corresponding SRS resource group.

2. A BS may transmit to a UE an SRI, a CRI, and/or an SSB ID for a random resource or a fixed specific resource (e.g., the first SRS resource) in an SRS resource group. In this case, the BS may configure a common CRI application field in the CRI and/or a common SSB ID application field in the SSB ID.

When the common CRI application field is ON, UE Tx beams on SRS resources in the SRS resource group may be set to a UE Tx beam indicated by the CRI designated for the random SRS resource or the fixed specific SRS resource in the corresponding SRS resource group (this may be interpreted to means that a UE Rx beam on which the CRI is received corresponds to the UE Tx beam).

When the common SSB ID application field is ON, UE Tx beams on SRS resources in the SRS resource group may be set to a UE Tx beam indicated by the SSB ID designated for the random SRS resource or the fixed specific SRS resource in the corresponding SRS resource group (this may be interpreted to means that a UE Rx beam on which the SSB ID is received corresponds to the UE Tx beam). When the common SSB ID application field is OFF, the UE may implicitly know that each SRS resource in the SRS resource group correspond to a different Tx beam instead of the same UE Tx beam.

Proposal 3 (Configuration of UE Tx Beam Based on UL Transmission Configuration Indicator (TCI))

A BS may designate a UE Tx beam on an SRS resource in an SRS resource group by configuring a UL TCI according to the following methods.

1. A common UL TCI may be configured for one SRS resource group. The common UL TCI may be configured by a combination of an SRI, a CRI, and/or an SSB ID. Such a configuration method may be predetermined by higher layers. Thus, a BS may transmit a specific common UL TCI for a specific SRS resource group to a UE through L1 (DCI), L2 (MAC-CE), or L3 (DCI) signaling to designate a UE Tx beam on SRS resources in the SRS resource group. Upon receiving the common UL TCI, the UE may know the UE has the same UE Tx beam for the SRS resources in the corresponding SRS resource group.

2. A BS may transmit to a UE an SRI or a UL TCI for a random resource or a fixed specific resource (e.g., the first SRS resource) in an SRS resource group. In this case, the BS may configure a common UL TCI application field in the UL TCI. When the UL TCI application field is ON, the UE may know that UE Tx beams on SRS resources in the SRS resource group are set to a UE Tx beam indicated by the TCI designated for the random SRS resource or the fixed specific SRS resource in the SRS resource group. When the common UL TCI application field is OFF, the UE may implicitly know that each SRS resource in the SRS resource group correspond to a different Tx beam instead of the same UE Tx beam.

Figure 7:
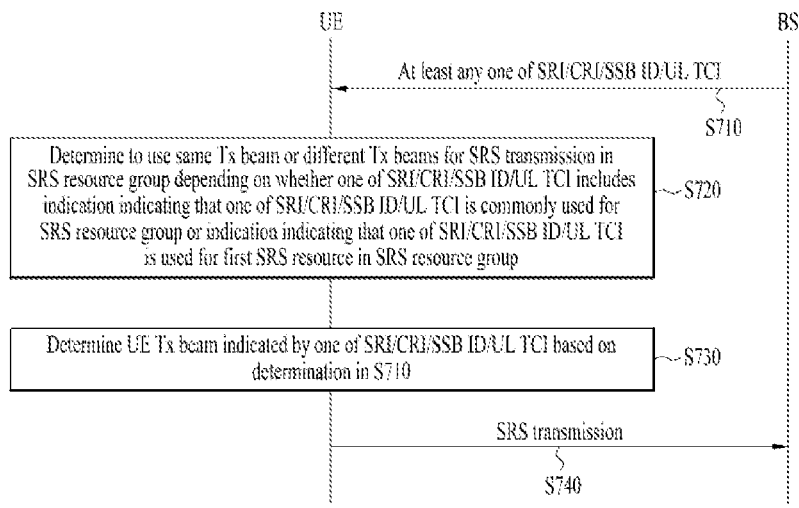
FIG. 7 is a diagram illustrating a procedure in which a UE transmits an SRS based on a UE Tx beam transmission configuration according to Proposals 1 to 3.

As described above, the present disclosure is related to the methods of informing or configuring a UE Tx beam for UL in one SRS resource group including multiple SRS resources when SRS transmission is performed in the NR system FIG. 7 is a diagram illustrating a procedure in which a UE transmits an SRS based on a UE Tx beam transmission configuration according to Proposals 1 to 3.

Procedure in which UE Transmits SRS Based on UE Tx Beam Transmission Configuration According to Proposals 1 to 3

Referring to FIG. 7, a UE may receive (at least) any one of an SRI, a CRI, an SSB ID, and a UL TCI from a BS (S710). The UE may determine whether to use the same Tx beam or different Tx beams for SRS transmission in an SRS resource group depending on whether the one received in S710 includes an indication indicating that the received one is commonly used for the SRS resource group or an indication indicating that the received one is used for a first SRS resource in the SRS resource group (S720).

The received one including the indication indicating that the received one is commonly used for the SRS resource group may be any one of a common SRI, a common CRI, a common SSB ID, and a common UL TCI, which are commonly applicable to the SRS resource group as described above in Proposals 1 to 3. Alternatively, when the received one includes an indicator indicating that the received one is an SRI/CRI/SSB ID/UL TCI for the first SRS resource in the SRS resource group but the SRI/CRI/SSB ID/UL TCI is commonly applicable to the SRS resource group (i.e., when a common SRS application field/common CRI application field/common SSB ID application field/common UL TCI application field is ON), the UE may determine the same Tx beam for the SRS transmission in the SRS resource group (S730).

On the other hand, when the received one includes an indicator indicating that the received one is the SRI/CRI/SSB ID/UL TCI for the first SRS resource in the SRS resource group and the SRI/CRI/SSB ID/UL TCI is not commonly applied to the SRS resource group (i.e., when the common SRS application field/common CRI application field/common SSB ID application field/common UL TCI application field is OFF), the UE may determine the use of a Tx beam indicated by the SRI/CRI/SSB ID/UL TCI on the first SRS resource in the SRS resource group and determine the use of a Tx beam, which is different from the Tx beam to be used on the first SRS resource, on a second SRS resource (i.e., an SRS resource different from the first SRS resource) in the SRS resource group (S730).

The UE may transmit the SRS to the BS on the first SRS resource based on the determined Tx beam (S740).

Figure 8:
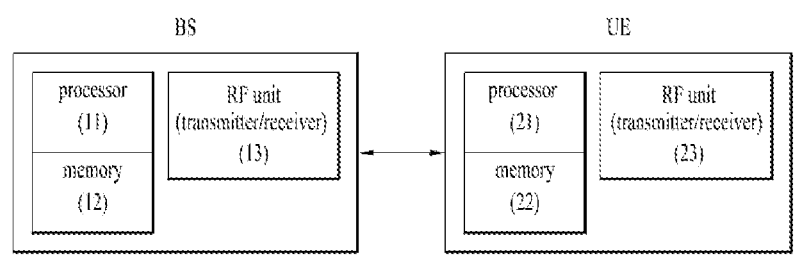
FIG. 8 is a block diagram illustrating a UE for transmitting an SRS based on a UE beam transmission configuration according to Proposals 1 to 3.

FIG. 8 is a block diagram illustrating a UE for transmitting an SRS based on a UE beam transmission configuration according to Proposals 1 to 3.

Referring to FIG. 8, a receiver 23 of the UE may be configured to receive (at least) any one of an SRI, a CRI, an SSB ID, and a UL TCI from a BS. A processor 21 of the UE may be configured to determine whether to use the same Tx beam or different Tx beams for SRS transmission in an SRS resource group depending on whether the one received in S710 includes an indication indicating that the received one is commonly used for the SRS resource group or an indication indicating that the received one is used for a first SRS resource in the SRS resource group The received one including the indication indicating that the received one is commonly used for the SRS resource group may be any one of a common SRI, a common CRI, a common SSB ID, and a common UL TCI, which are commonly applicable to the SRS resource group as described above in Proposals 1 to 3. Alternatively, when the received one includes an indicator indicating that the received one is an SRI/CRI/SSB ID/UL TCI for the first SRS resource in the SRS resource group but the SRI/CRI/SSB ID/UL TCI is commonly applicable to the SRS resource group (i.e., when a common SRS application field/common CRI application field/common SSB ID application field/common UL TCI application field is ON), the processor 21 of the UE may be configured to determine the same Tx beam for the SRS transmission in the SRS resource group.

On the other hand, when the received one includes an indicator indicating that the received one is the SRI/CRI/SSB ID/UL TCI for the first SRS resource in the SRS resource group and the SRI/CRI/SSB ID/UL TCI is not commonly applied to the SRS resource group (i.e., when the common SRS application field/common CRI application field/common SSB ID application field/common UL TCI application field is OFF), the processor 21 of the UE may be configured to determine the use of a Tx beam indicated by the SRI/CRI/SSB ID/UL TCI on the first SRS resource in the SRS resource group and determine the use of a Tx beam, which is different from the Tx beam to be used on the first SRS resource, on a second SRS resource (i.e., an SRS resource different from the first SRS resource) in the SRS resource group.

A transmitter 23 of the UE may be configured to transmit the SRS on the first SRS resource based on the determined Tx beam.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of transmitting an SRS and UE therefor may be industrially applied to various wireless communication systems including the 3GPP LTE/LTE-A system, the NR (5G) communication system, etc.

The invention claimed is:

1. A method of transmitting a sounding reference signal (SRS) by a user equipment (UE), the method comprising:
receiving information on a configuration of a common UL (uplink) TCI (Transmission Configuration Indication) for an SRS resource group based on a reception beam;
determining a first transmission beam corresponding to the reception beam based on the common UL TCI; and
transmitting the SRS on a specific SRS resource based on the first transmission beam of the UE,
wherein the common UL TCI includes a set of SRI (SRS resource indicator), a channel state information reference signal (CSI-RS) indicator (CRI), and a synchronization signal block (SSB) identifier for the SRS resource group,
wherein the SRS resource group includes a plurality of SRS resources comprising the specific SRS resource,
wherein the common UL TCI includes a field indicating whether the common UL TCI is commonly used for the plurality of SRS resources included in the SRS resource group,
wherein, based on the field indicating that the common UL TCI is commonly used for the plurality of SRS resources, a transmission beam used for transmission of the SRS on the plurality of SRS resources is the same as the first transmission beam, and
wherein, based on the field indicating that the common UL TCI is used for the specific SRS resource, transmission beams used for transmission of the SRS on each of the plurality of SRS resources are different.

2. The method of claim 1, wherein the common UL TCI is received through downlink control information (DCI), radio resource control (RRC) signaling, or a medium access control element (MAC-CE).

3. The method of claim 1, wherein the SRS is transmitted in one, two, or four symbols on the specific SRS resource.

4. A user equipment (UE) for transmitting a sounding reference signal (SRS), the UE comprising:
a receiver configured to receive information on a configuration of a common UL (uplink) TCI (Transmission Configuration Indication) for an SRS resource group based on a reception beam;
a processor configured to determine a first transmission beam corresponding to the reception beam based on the common UL TCI; and
a transmitter configured to transmit the SRS on a specific SRS resource based on the first transmission beam,
wherein the common UL TCI includes a set of SRI (SRS resource indicator), a channel state information reference signal (CSI-RS) indicator (CRI), and a synchronization signal block (SSB) identifier for the SRS resource group,
wherein the SRS resource group includes a plurality of SRS resources comprising the specific SRS resource,
wherein the common UL TCI includes a field indicating whether the common UL TCI is commonly used for the plurality of SRS resources included in the SRS resource group,
wherein, based on the field indicating that the common UL TCI is commonly used for the plurality of SRS resources, a transmission beam used for transmission of the SRS on the plurality of SRS resources is the same as the first transmission beam, and
wherein, based on the field indicating that the common UL TCI is used for the specific SRS resource, transmission beams used for transmission of the SRS on each of the plurality of SRS resources are different.

5. The UE of claim 4, wherein the receiver is configured to receive the common UL TCI through downlink control information (DCI), radio resource control (RRC) signaling, or a medium access control element (MAC-CE).

6. The UE of claim 4, wherein the transmitter is configured to transmit the SRS in one, two, or four symbols on the specific SRS resource.

7. The UE of claim 4, wherein the UE is capable of communicating with at least one of another UE, a UE related to an autonomous driving vehicle, a base station or a network.

* * * * *